Dec. 1, 1931. R. SALLER 1,833,977
SPEED CLUTCH
Filed Dec. 20, 1928 2 Sheets-Sheet 1

Inventor:
Roberto Saller

Dec. 1, 1931.   R. SALLER   1,833,977
SPEED CLUTCH
Filed Dec. 20, 1928   2 Sheets-Sheet 2

Inventor:
Roberto Saller
By
Attorney.

Patented Dec. 1, 1931

1,833,977

UNITED STATES PATENT OFFICE

ROBERTO SALLER, OF BUENOS AIRES, ARGENTINA

SPEED CLUTCH

Application filed December 20, 1928. Serial No. 327,308.

My present invention relates to certain improvements in speed clutches of the type disclosed in my prior Patent No. 1,724,044, dated August 13, 1929, its main object being to provide an improved hydraulic progressive speed clutch which shows many practical advantages over those proposed and used heretofore.

The invention has also other objects in view which will be clearly seen from the following description.

In order that my present invention may be clearly understood and easily carried into practice, a preferred embodiment thereof has been shown in the appended drawings wherein.

Similar characters of reference denote the same or like parts throughout the said drawings.

With reference to the said drawings: 1 is the fly wheel provided with a number of cylinders cast in one piece.

2 are the pistons, 3 the connecting rods, 4 is the connecting rod hub, 5 is the liquid control valve body, 6 is the valve thereof and 7 the valve cover. 10 are piston and hub-pins, 11 is the hub to fly-wheel support pin, 12 are pipes connecting the cylinders to the valve. 13 are the cylinder plugs, 14 is the control valve connecting rod, 15 is a control lever, 16 are the control lever pins, 17 is the control lever bracket, 18 is the drive-shaft bearing and control-lever support, 19 is the fly-wheel cover, 20 are the fly-wheel cover screws. 21 is an eccentric which forms the bearing for the connecting rod-hub 4, 22 are the eccentric control levers, 23 are the eccentric control lever-pins, 24 is the main drive shaft, 25 is the motor crank shaft.

The hydraulic progressive clutch is divided into two sections. One of these is composed of the fly-wheel, pistons, connecting rods, connecting rod-hub, control valve, pipings, drive shaft bearing, control lever support and fly-wheel cover. The second section is constituted by the eccentric mechanism and main drive shaft.

These two sections may rotate separately or as one unit.

Figure 1:
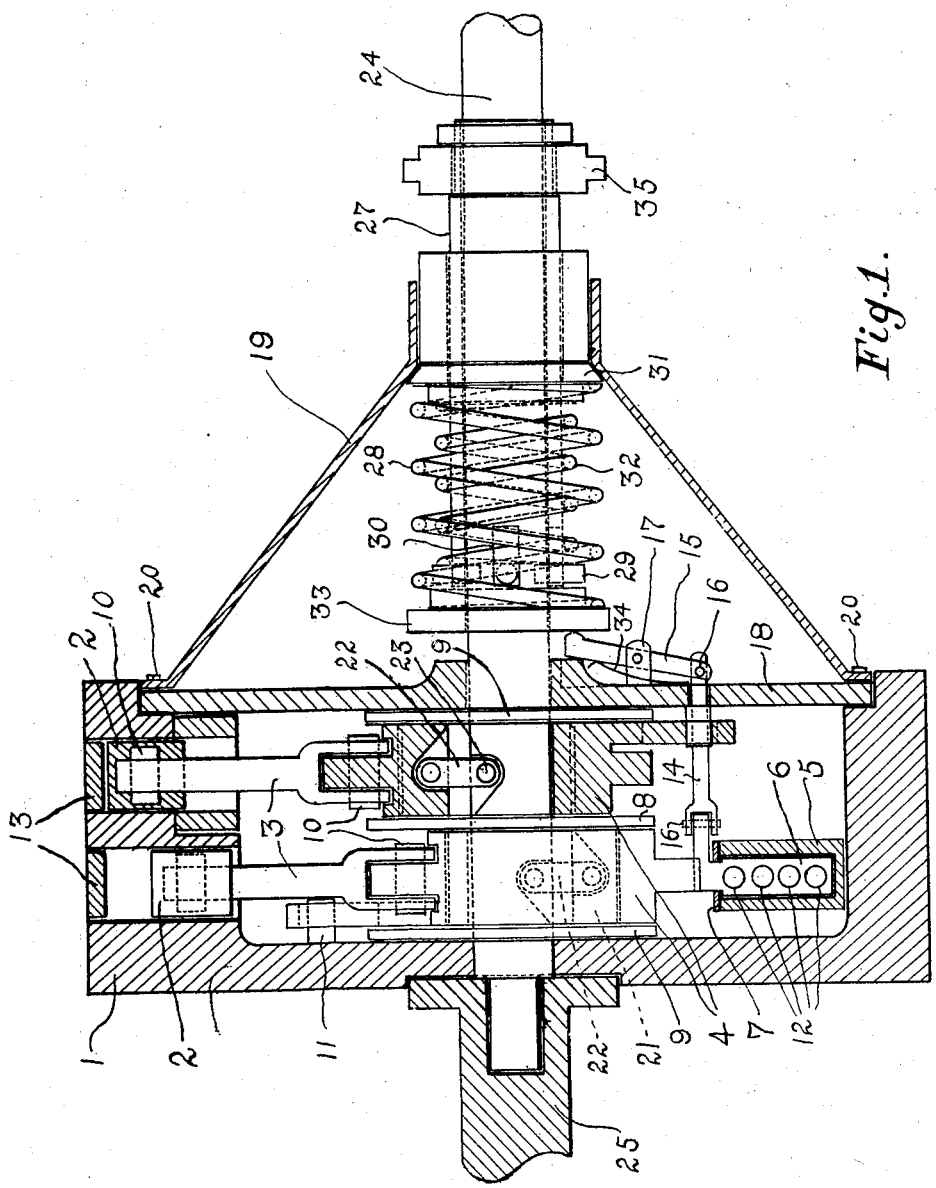
Figure 1 is a longitudinal section of the fly wheel with the clutch mechanism according to my present invention.
Figure 2:
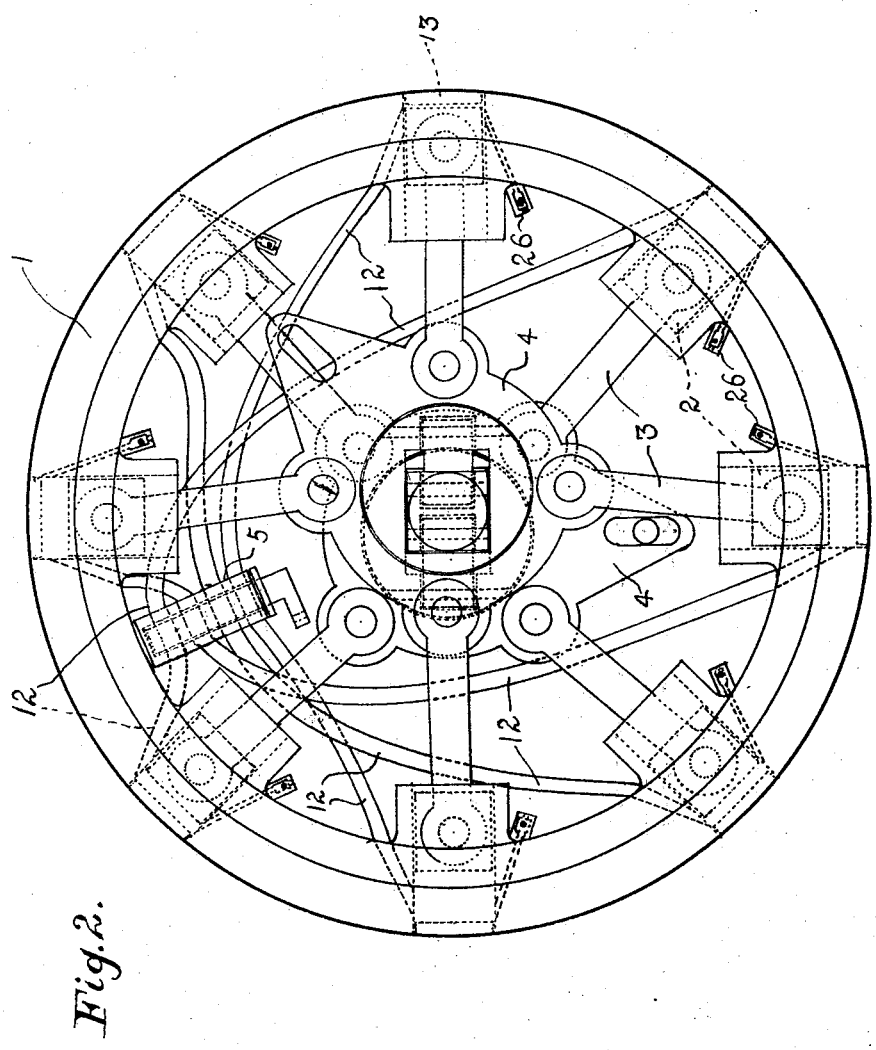
Figure 2 is a side view of the clutch with the drive-shaft bearing and fly-wheel cover removed.

According to the improvement of my present invention, the cylinders are arranged in pairs set at 180° angle. Each pair of cylinders are connected with a pipe 12, with the control valve in the line. With this arrangement, all the liquid pumped out of one cylinder flows through the pipe 12 and valve into the opposite cylinder. This is to prevent the forming of vacuum in the cylinder during the suction stroke, causing the piston to knock badly, which was the case in my former invention. Each cylinder is provided with an automatic auxiliary liquid inlet 26, which admits to the cylinder the same amount of liquid that may leak out past the piston or control valve. In Figure 2, eight pumps are shown, four on each eccentric. However, any number of pairs of pumps may be used. Also one control valve is shown but, if desired more may be used in the clutch. In all cases the cylinders, piping and control valve are filled with liquid, whether in or out of operation.

According to my present improvement two eccentrics 21 are used, they being arranged to operate at an angle of 180° from each other. With this system, the complete mechanism is maintained in balance, regardless of the position of the eccentrics and therefore the counterbalance is eliminated.

According to my present improvement, the control has been modified in order to permit independent control of the eccentrics and of the liquid control valve. A sleeve 27 has been added on the main drive shaft 24 which is held in place by the main drive shaft pressure spring support and sleeve guide pins 29. The sleeve guide pin slots 30 permit the sleeve sufficient in and out travel to operate the liquid control valve. The drawings show two springs. On one end both springs are supported by control spring thrust bearing 31. On the other end the small spring 32 is supported by the main drive shaft pressure spring support and control sleeve guide pins 29. The large spring 28 applies its pressure to the sleeve liquid control valve flange 33. The control lever 15 is normally brought against the said flange by action of a spring 34. The drawings show the eccentrics out and the pistons in the working position, but the liquid control valve is still open, allowing the sleeve 27 to move in until the opposite end of the slots 30 rest on the guide pins 29, in which position the liquid control valve is closed. Now, moving again the sleeve 27 to the position as shown in the drawings, only the large spring 28 has been compressed with this movement and the main drive shaft 24 has been held stationary by the small spring 32. As the sleeve 27 is withdrawn further, the end of the slots 30 come into contact with the guide pins 29, from which point on, both control sleeve 27 and main drive shaft 24 are withdrawn together until the clutch is in neutral position.

By the foregoing it can be seen that the eccentrics and the liquid control valve are operated separately, that is to say, the liquid control valve is always open when the eccentric is moved and the eccentric is always in working position before the liquid control valve can be operated. This permits the setting of the liquid control valve to any desired position without disturbing the eccentric. The clutch is operated by a lever, not shown, connected to a collar 35. The connecting rod is fastened to the thrust washer 8 or the thrust washers 9 nearest to the fly-wheel. This washer rotates with the main drive shaft. The working of the clutch mechanism substantially corresponds to that of my previous application.

It is obvious that many constructional and other changes may be introduced without departing from the scope of the invention which has been clearly set forth in the appended claims.

Having now fully described and ascertained the nature of my present invention and in what manner the same is to be carried into practice, I declare that what I claim and desire to protect by Letters Patent is:—

1. A progressive hydraulic speed clutch comprising a fly-wheel having a plurality of pairs of cylinders therein; a piston for each cylinder; a motor crank shaft secured to said fly-wheel; a main drive shaft; a pair of hubs eccentrically mounted on the main shaft, said drive shaft being axially shiftable to vary the eccentricity of the hubs and said pistons being connected to said hubs; pipes connecting each pair of opposite cylinders; a control valve for the pipes connected between the cylinders of each pair; and means for separately operating said control valve and axially shifting said drive shaft to vary the eccentricity of the hubs.

2. A progressive hydraulic speed clutch comprising a fly-wheel having a plurality of pairs of cylinders therein and liquid therein; a piston for each cylinder; a motor crank shaft secured to said fly-wheel; a main drive shaft; a pair of hubs eccentrically mounted on the main shaft at 180° from each other, said drive shaft being axially shiftable to vary the eccentricity of the hubs and said pistons being connected to said hubs; pipes connecting each pair of opposite cylinders; a control valve for the pipes connected between the cylinders of each pair; and means for separately operating said control valve and axially shifting said drive shaft to vary the eccentricity of the hubs.

3. A progressive hydraulic speed clutch comprising a fly-wheel having a plurality of pairs of cylinders therein; a piston for each cylinder; a motor crank shaft secured to said fly-wheel; a main drive shaft; a pair of hubs eccentrically mounted on the main shaft, said drive shaft being axially shiftable to vary the eccentricity of the hubs and said pistons being connected to said hubs; pipes connecting each pair of opposite cylinders; a control valve for the pipes connected between the cylinders of each pair; a lever system for the valve; and means on the main shaft for operating the lever system and for adjusting and axially shifting said drive shaft to vary the eccentricity of the hubs.

4. A progressive hydraulic speed clutch comprising a fly-wheel having a plurality of pairs of cylinders therein; a piston for each cylinder; a motor crank shaft secured to said fly-wheel; a main drive shaft; a pair of hubs eccentrically mounted on the main shaft, said drive shaft being axially shiftable to vary the eccentricity of the hubs and said pistons being connected to said hubs; pipes connecting each pair of opposite cylinders; a control valve for the pipes connected between the cylinders of each pair; a lever system for the valve; means on the main shaft for operating the lever system and for adjusting and axially shifting said drive shaft to vary the eccentricity of the hubs; and an automatic auxiliary liquid inlet for each cylinder.

5. A progressive hydraulic speed clutch comprising a fly-wheel having a plurality of pairs of cylinders therein; a piston for each cylinder; a motor crank shaft secured to said fly-wheel; a main drive shaft; a pair of hubs eccentrically mounted on the main shaft, said drive shaft being axially shiftable to vary the eccentricity of the hubs and said pistons being connected to said hubs; pipes connecting each pair of opposite cylinders; a control valve for the pipes connected between the cylinders of each pair; a plurality of springs on the main drive shaft; and means for separately operating said control valve and axially shifting said drive shaft to vary the eccentricity of the hubs.

In testimony whereof I affix my signature.

ROBERTO SALLER.